United States Patent [19]

Sherrick et al.

[11] Patent Number: 4,560,428
[45] Date of Patent: Dec. 24, 1985

[54] SYSTEM AND METHOD FOR PRODUCING CURED COMPOSITES

[75] Inventors: George O. Sherrick; Joseph R. Rosenthal, both of Tulsa, Okla.

[73] Assignee: Rockwell International Corporation, El Segundo, Calif.

[21] Appl. No.: 642,010

[22] Filed: Aug. 20, 1984

[51] Int. Cl.[4] .............................................. B32B 35/00
[52] U.S. Cl. ................... 156/94; 156/273.9; 156/286; 156/382; 219/528; 219/553; 264/36; 338/212; 338/225; 338/314; 428/349; 428/408; 428/913
[58] Field of Search ...................... 156/94, 273.9, 382, 156/286; 428/349, 367, 408, 913; 219/528, 549, 553; 264/36; 338/212, 225, 314

[56] References Cited

U.S. PATENT DOCUMENTS

| | | | |
|---|---|---|---|
| 1,778,183 | 10/1930 | Burke | 156/273.9 X |
| 2,489,643 | 11/1949 | Hunter | 219/528 X |
| 3,239,403 | 3/1966 | Williams et al. | 156/273.9 |
| 3,277,419 | 10/1966 | Butz | 219/345 X |
| 3,679,534 | 7/1972 | Weinberg | 156/273.9 X |
| 3,859,504 | 1/1975 | Motokawa et al. | 219/528 X |
| 3,900,654 | 8/1975 | Stinger | 219/528 X |
| 3,964,958 | 6/1976 | Johnston | 156/382 |
| 4,055,526 | 10/1977 | Kiyokawa et al. | 219/528 X |
| 4,058,704 | 11/1977 | Shimizu | 219/528 |
| 4,250,397 | 2/1981 | Gray et al. | 219/528 X |
| 4,250,398 | 2/1981 | Ellis et al. | 219/528 X |
| 4,284,451 | 8/1981 | Conley | 156/97 |
| 4,314,144 | 2/1982 | Wojtecki et al. | 219/528 |
| 4,409,270 | 10/1983 | Faber et al. | 156/94 X |

*Primary Examiner*—Robert A. Dawson
*Attorney, Agent, or Firm*—Charles T. Silberberg; Max Geldin

[57] ABSTRACT

System and method for producing a composite, particularly applicable for repairing damage to a structural component, wherein an electrical resistance heating element basically in the form of a layer of conductive carbon or graphite, e.g., in fiber form, becomes bonded to and forms a part of the cured composite. In the repair of a parent structure, a patch comprising a heat curable resinous material is applied to the parent structure, and a heat bondable adhesive film is positioned between the parent structure and the patch. An electrical resistance heating element in the form of a layer of graphite fibers is provided in contact with, or forming a part of, the patch, the heating element being capable of bonding the patch to the parent structure upon heating the adhesive bond to a predetermined temperature, to form a unitary structure comprised of the damaged parent structure, the patch and the heating element.

37 Claims, 7 Drawing Figures

SYSTEM AND METHOD FOR PRODUCING CURED COMPOSITES

BACKGROUND OF THE INVENTION

This invention is directed to a system for fabricating composites, and is particularly concerned with the provision of a system and method for producing composites, and particularly for repair of structurable members, wherein a component of the final composite functions as a heating element, for example in the form of a patch, to integrally bond such heating element or patch to a component of the composite or parent structural member.

A problem associated with the secondary or vacuum bag curing of composite materials is the introduction of heat to the materials to be cured, for example during repair of a structural component. Present practice involves the application of a heating blanket to cover the area to be cured or repaired, as well as structures in the vicinity of such area as determined by the size of the heating blanket. The resultant "global" effect of such large area heating has resulted in unsatisfactory curing of the composite and repair induced damage to a component due to the difficulty of maintaining constant and uniform heat distribution over such large area, especially in the presence of metallic parts.

Further, where a structural component, e.g., of an aircraft, and formed of molded plastic, metal or other material, requires repair, as by application of a patch to the damaged area, the necessity for using a heating blanket for bonding such repair patch to the structural component has also complicated the repair procedure due to the necessity of using the correct size and number of heating blankets to assure adequate heat distribution.

U.S. Pat. No. 4,250,398 discloses a unitary, composite laminate or sandwich structure used as a radiant heating device or heating blanket, and a method of producing the structure. The composite comprises an electrically insulating top and bottom layer surrounding an electrically conductive layer composed mainly of carbon, and is capable of emitting electromagnetic radiation when an electric current is passed therethrough.

U.S. Pat. No. 4,284,451 discloses a method and an apparatus for tire repair wherein flexible heating pads are applied to both the inside and outside of a patch area of a tire casing, and held in place under equalized pressure against the patch area by inflatable means. An electrical power source when used in conjunction with an inflatable air bag applies sufficient heat and pressure to patch the defective area.

U.S. Pat. No. 4,409,270 discloses a method for repairing surface defects in a cured, molded fiberglass reinforced plastic, primarily for cosmetic repairs and not structural type repair, wherein an external heating mat is employed and the repair material is electrically conductive.

U.S. Pat. No. 3,900,654 discloses a composite polymeric structure used as an electric heating element. The electrically conductive layer is formed of an electrically conductive elastomeric material made by mixing a fluoroelastomer with a conductive carbon black, and conductor means for electrically connecting the structure to a power supply.

Other prior art patents involving the use of carbon materials as external heating elements include U.S. Pat. Nos. 3,859,504; 3,277,419; and 2,489,643. All of these patents involve some form of resistive heating to produce heat which is generally thermally conducted into the desired areas.

In summary, the prior art patents as exemplified above involve external heating application only, that is the use of heating pads, blankets and panels.

Accordingly, one object of the present invention is the provision of a system for producing a composite or laminate wherein one or more elements or layers of the composite functions as a heating element or elements for curing the composite.

Another object is to provide a system and method for producing a cured composite, particularly wherein the parent material is a structural component, e.g., of a resinous material, which has been damaged and requires repair, and wherein an element or patch to be bonded to the parent material to form a composite has means incorporated therein which functions as a heating element or elements to effect such bonding.

A still further object is the provision of a system and method as noted above, for producing an integral cured composite, employing a heating element which is electrically conductive, and wherein reduced electrical energy requirements are achieved as compared to conventional heating for integral bonding of a heat curable layer or an element to a parent material.

SUMMARY OF THE INVENTION

According to the invention, a system and method for producing a composite or laminate is provided, wherein a heating element forms a part of the cured composite. Thus, an element of the composite functions as an electrical resistance heating element which is positioned adjacent to or incorporated in a heat curable component, and the resistance heating element is capable of integrally bonding such component to a parent material upon heating such component to a predetermined temperature by the electrical resistance heating element. The electrical resistance heating element comprises basically a layer of conductive carbon or graphite, particularly in fiber form.

According to a preferred embodiment, the system and method of the invention have been found particularly valuable for application in the area of repairing damage to a parent structural component of an aircraft. In repairing such structural component, an integral layer of an electrically conductive carbon material such as graphite is employed as an electrical resistance heating element. Such heating element is employed in conjunction with or can form a part of a heat curable component or patch which is placed adjacent to the parent material to be repaired, and upon passage of an electrical current through the electrically conductive resistance heating element sufficient to raise the temperature of the curable component or patch to effect curing, such patch together with the graphite heating element become bonded to the parent material to form a composite, and the parent structural material is thereby repaired.

Accordingly, in its broad aspects, the invention provides a system for producing a composite which comprises a parent component, an electrical resistance heating element in the form of a layer comprising carbon, positioned adjacent to the parent component, means capable of bonding the heating element to the parent component to produce a composite upon heating the bonding means to a predetermined temperature, and electrical power means connected to the heating element. The bonding means is preferably a heat curable component such as a partially cured resin or adhesive.

The electrical resistance heating element can comprise a layer of graphite fibers, e.g., a graphite tape, or a layer of graphite fibers impregnated with a partially cured, e.g., "B" to "C" stage, thermosetting resin. The bonding means can comprise a film of a heat bondable material such as a film adhesive, interposed between the parent component and the heating element.

According to a preferred embodiment, the present invention provides a system for repairing a damaged structure, e.g., a damaged aircraft component, which comprises a parent structure, a patch to be bonded to the parent structure, the patch comprising a resinous matrix material, and an adhesive film positioned between the parent structure and the patch, the adhesive film capable of bonding the patch to the parent structure upon heating the adhesive film to a predetermined temperature. The patch can comprise a thermosetting heat curable resinous material or a thermoplastic resinous material, or a combination thereof to form plural layers, if desired. An electrical resistance heating element in the form of a layer of graphite fibers is provided, in contact with or forming a part of the resinous matrix of the patch, the heating element being capable of bonding the patch to the parent structure upon heating the adhesive bond to such predetermined temperature, to form a unitary structure composed of the damaged parent structure, the patch and the heating element. Electrical connections are provided to the resistance heating element for passing an electric heating current therethrough.

The integral heating or self curing system and process of the invention has a number of advantages over the prior art. Particularly as applied to repair of a cured resin structural component by integral heating of an electrically conductive patch containing a conductive graphite material, the results obtained by the present invention include self curing produced by integral heating in the patch itself, avoidance of a separate heating element or heating blanket presently required in the prior art, substantially reduced electrical energy requirements, e.g., of about 80 percent as compared to conventional heating, repair induced damage is minimized to a "local" area of the patch, as against a substantially larger area employing prior art heating means, and the integral heating element can provide strength in the direction of load. Further, the integral resistance heating concept of the invention is feasible for high temperature applications, and can be employed to provide a hot bond repair kit. Further repairs can be made on sharp or irregular contours using staged or thermoplastic resinous materials in the patch.

BRIEF DESCRIPTION OF THE DRAWINGS

A better understanding of the invention may be had by reference to the following detailed description, taken in conjunction with the accompanying drawings wherein.

DETAILED DESCRIPTION OF THE INVENTION AND PREFERRED EMBODIMENTS

Figure 2:
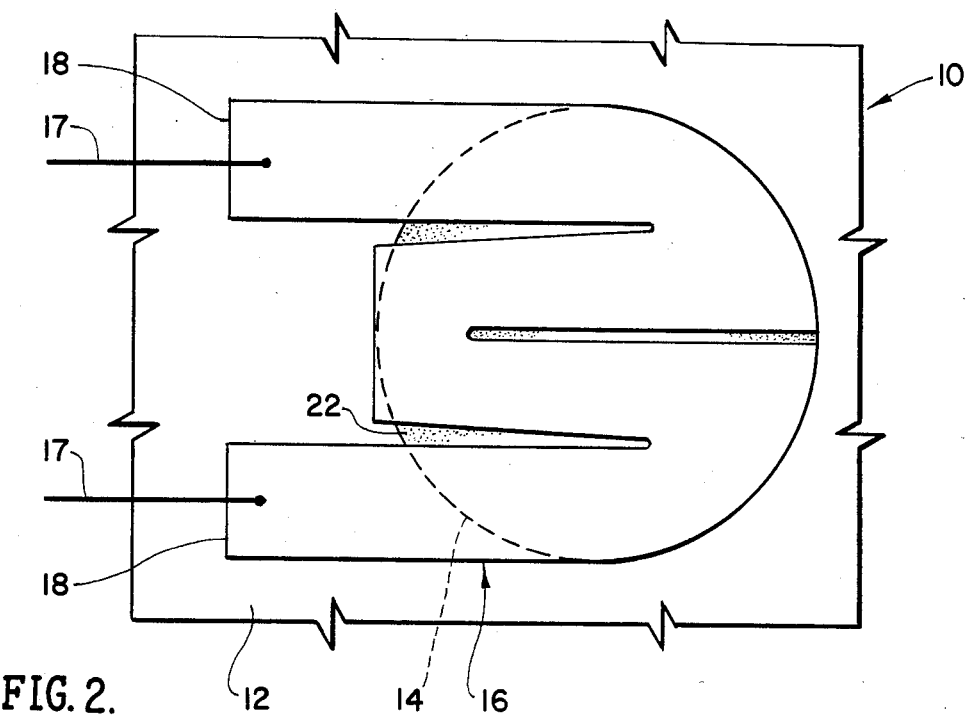
FIG. 2 is a plan view of the combination of FIG. 1.
Figure 1:
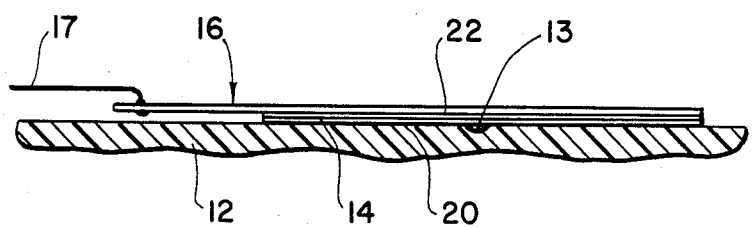
FIG. 1 is a schematic elevational view of an electrically conductive patch positioned on a parent material for integral attachment thereto according to the invention.
Figure 1A:
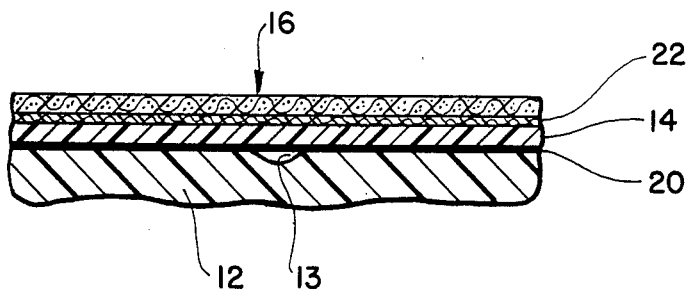
FIG. 1a is an enlarged sectional view of the layered assembly of FIG. 1.

Referring to FIGS. 1, 1a and 2 of the drawings, numeral 10 illustrates a system according to the invention, comprising a parent material 12, which can be a structural component that has been damaged at 13 and requires repair, a circular patch 14 positioned on the parent material, and which is to be bonded thereto for repairing same, and a heating element 16 positioned over and in contact with the patch 14.

The parent material 12 can be any type of structural material to which a bondable material such as a partially cured resin or adhesive can be connected. Thus, for example, the parent material can be a fully cured thermosetting resin or plastic material such as a compression molded plastic. The parent structural material or component can be formed of other materials which will withstand curing or bonding temperatures to which the system is subjected, including metals such as aluminum, titanium or their alloys.

The patch 14 to be integrally connected to the parent material 12, can be formed of any combination of heat curable materials. Thus, the patch 14 can comprise fiber reinforced components such as graphite impregnated with a tough viscous polymer which is thermosetting such as epoxy or epoxy-novolac resin. The resin is partially cured, e.g., "B" staged, or between "B" and "C" staged, to permit final curing by the application of heat. Other materials which can be employed include, for example, graphite or fiberglass impregnated with partially cured polyamide or polyimide resin. Further, the patch can comprise graphite or fiberglass impregnated with a high temperature thermoplastic matrix material such as the resin marketed as "Peek" resin, understood to be a polyether ether ketone resin, polyphenylene sulfone and polycarbonate resins.

The heating element 16 is comprised of a layer of electrically conductive carbon or graphite, which can be in the form of an unimpregnated graphite tape or fabric, and can be either a structural or non-structural element of the final repaired composite. Further, a plurality of two or more of such heating elements can be employed, for example above and below the patch, particularly when the patch is relatively thick.

The heating element 16 has an M-shaped configuration, as seen in FIG. 2, with outwardly extending ears 18 disposed opposite each other, to which are connected electrical terminals as at 17. The pattern for the heating element 16 shown in FIG. 2 is representative of a series circuit, and other patterns such as U-shaped can be employed for this purpose.

A layer or film of heat bondable adhesive 20 is provided between the patch 14 and the parent material 12. Such adhesive layer can be for example a heat curable "B" staged, or "B" to "C" staged epoxy resin adhesive, or the patch resin which bleeds into the interface between the patch and the parent material. Such adhesive resin aids in bonding both the patch 14 and the graphite heating element or ply 16 to the parent material upon application of heat during curing. In addition, a catalyzed adhesive can be used in conjunction with heating.

A layer of insulating material 22 is optionally provided between the patch 14 and the heating element 16. Such insulating layer can comprise, for example, a layer of fiberglass, Kevlar, which is a poly (paraphenylterepthalamide), or the like.

Curing of the assembly indicated at 10 can be accomplished in conventional manner employing a vacuum bag cure cycle for the resin and/or adhesive systems employed. Electricity produced by an AC or DC power source connected at 17 to the ears 18 of the heating element 16 produces heat as a result of resistance heating in the graphite fibers of the heating element to thereby raise the temperature of the assembly sufficiently to cure the staged epoxy resin of the patch 14 and the adhesive layer 20, to effect integral bonding of the heating element 16 and the patch 14 to the parent material, thereby forming an integral composite 10 and effecting the repair of the parent material. The ears 18 can then be removed.

Figure 4:
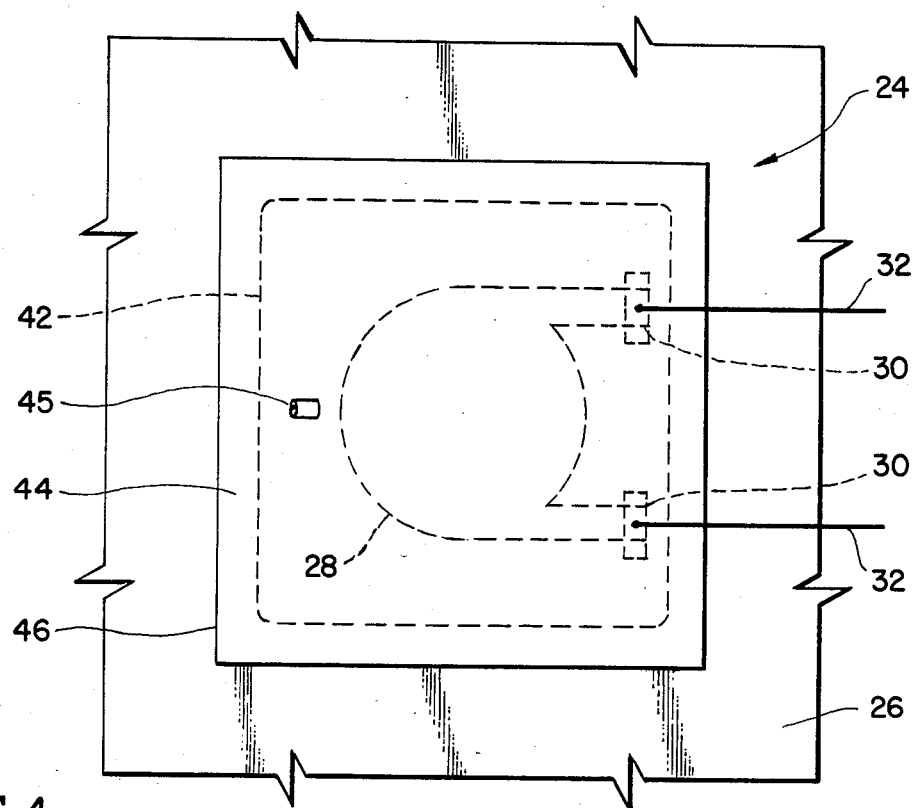
FIG. 4 is a plan view of the system of FIG. 3.
Figure 3:
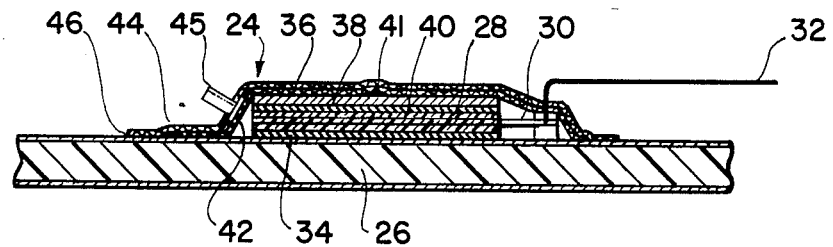
FIG. 3 illustrates a preferred embodiment of a system for integrally bonding a patch formed of conductive graphite material and a partially cured adhesive layer, to a parent structure.

Referring now to FIGS. 3 and 4 of the drawing, illustrating a typical system or cure configuration 24 according to the invention, there is shown a parent structure 26 such as a cured plastic, e.g., epoxy resin, structural component of an aircraft which requires repair. In this embodiment, a patch 28, comprised of a laminate of a plurality of graphite fiber reinforced epoxy resin impregnated tapes, forming a staged configuration which can be fully cured by further heating, is placed over the structural component 26. A pair of oppositely disposed ears 30 (see FIG. 4) connected to the patch 28 and formed of the same graphite-epoxy material as the patch, have electrical connections 32 thereon to a voltage source, for passing an electric current through the heating element comprised of the graphite contained in the patch 28 and the ears 30. The pattern for such heating element shown in FIG. 4 is also representative of a series circuit. Electrical contact to the patch can be facilitated by removal of the epoxy resin from the protruding ears 30, for example with methyl ethyl ketone (MEK), freon or other suitable solvent, but such treatment is optional.

Electrical isolation of the heat producing patch or ply 28 is provided by a layer of fiberglass, Kevlar or film adhesive, e.g., epoxy adhesive or other similar bondable electrical insulating material 34, positioned between the patch 28 and the parent structure 26.

An aluminum caul plate 36 is positioned over the assembly of the patch 28 and parent structure 26, to apply uniform pressure over this assembly during heating and curing. A layer of Kapton (polyimide resin) 38, or other suitable insulating material is positioned beneath the caul plate 36, and a porous layer of Teflon 40 or other similar non-sticking material, is provided beneath the insulating layer 38, to prevent sticking of insulating layer 38 to the heating ply or patch 28. A thermocouple 41 is provided on caul plate 36 to monitor patch temperature or provide feedback to a heat controller.

A breather material 42 is placed over the caul plate 36. Such breather material can be comprised of fiberglass cloth, polyester paper, and the like.

A vacuum bag 44 is then placed over the entire lay-up and the edges of the vacuum bag are sealed at 46 to the surface of the parent structure 26. A vacuum hose 45 is connected to the bag 44 to draw a vacuum within the interior of the assembly.

In operation, after a vacuum, e.g., of about 24-28" mercury, is drawn, an electrical current is passed via ears 30 through the graphite-containing heating element of patch 28 sufficient to raise the temperature so as to cause the film adhesive 34 and the resin of the patch 28, i.e., in the form of a staged resin, to co-cure and to integrally connect the patch 28 and the resistance heating element thereof to the parent structure 26 to effect the repair of such structure. The electrical current applied for heating the patch 28 to sufficient temperature for cure, e.g., about 275° F. to about 350° F., for epoxy resin, can be applied gradually up to 10 to 12 volts and about 3 amps for the series circuit arrangement illustrated in FIG. 4.

Following the repair procedure which integrally connects the patch 28 and the incorporated graphite heating element, to the parent structure, to form the final composite, the vacuum bag 44, breather material 42, caul plate 36, Kapton layer 38, Teflon layer 40 and thermocouple 41 are removed. The ears 30 used to provide electrical contact to the heating element of the patch can be removed from the final composite by cutting or sanding.

Thus, in each of the embodiments of FIGS. 1 and 3, it will be noted that the heating element 16 or the heating element incorporated in patch 28 becomes integrally bonded to and forms a component part of the final composite or laminate.

In the embodiment of FIGS. 1 and 2, if desired, the resin impregnated graphitic patch 14 can be omitted, and the heating ply or layer 16 of graphite fibers can be positioned in direct contact with the adhesive film 20 so that upon passage of electrical current through the heating element 16 the heating element will be integrally bonded to the parent material 12 through the resulting cured adhesive layer 20.

It will be noted that in accordance with the embodiment of FIGS. 1 and 2, the heating element can be formed of a separate layer of graphite material in the form of a graphite tape or fabric, or as illustrated in FIGS. 3 and 4 the heating element comprised of the graphite material or graphite fibers can be incorporated in the patch 28 containing partially cured resin.

Further, in the embodiments of FIGS. 1 and 3, alternatively, the film adhesive layer 20 in FIG. 1 or 34 in FIG. 3 can be omitted, and the bonding of the layer 16 or the patch 28 to the parent material 12 or 26 can be effected by the further curing of the partially cured resin in heating ply 16 or in the heating element of patch 28. However, in preferred practice, an adhesive film as at 20 or 34 is provided to effect efficient integral bonding of the heating ply 16 or the patch 28 to the parent material or structure during electrical resistance heating of the assembly as described above.

Further, the heating element and/or the patch can comprise a high temperature thermoplastic resin such as the above-noted polyether ether ketone resin, for high temperature applications, e.g., 700° F. or higher. The softening of such resin at elevated temperatures permits shaping the heating element and patch around irregular or sharp contours of the parent structure.

Figure 6:
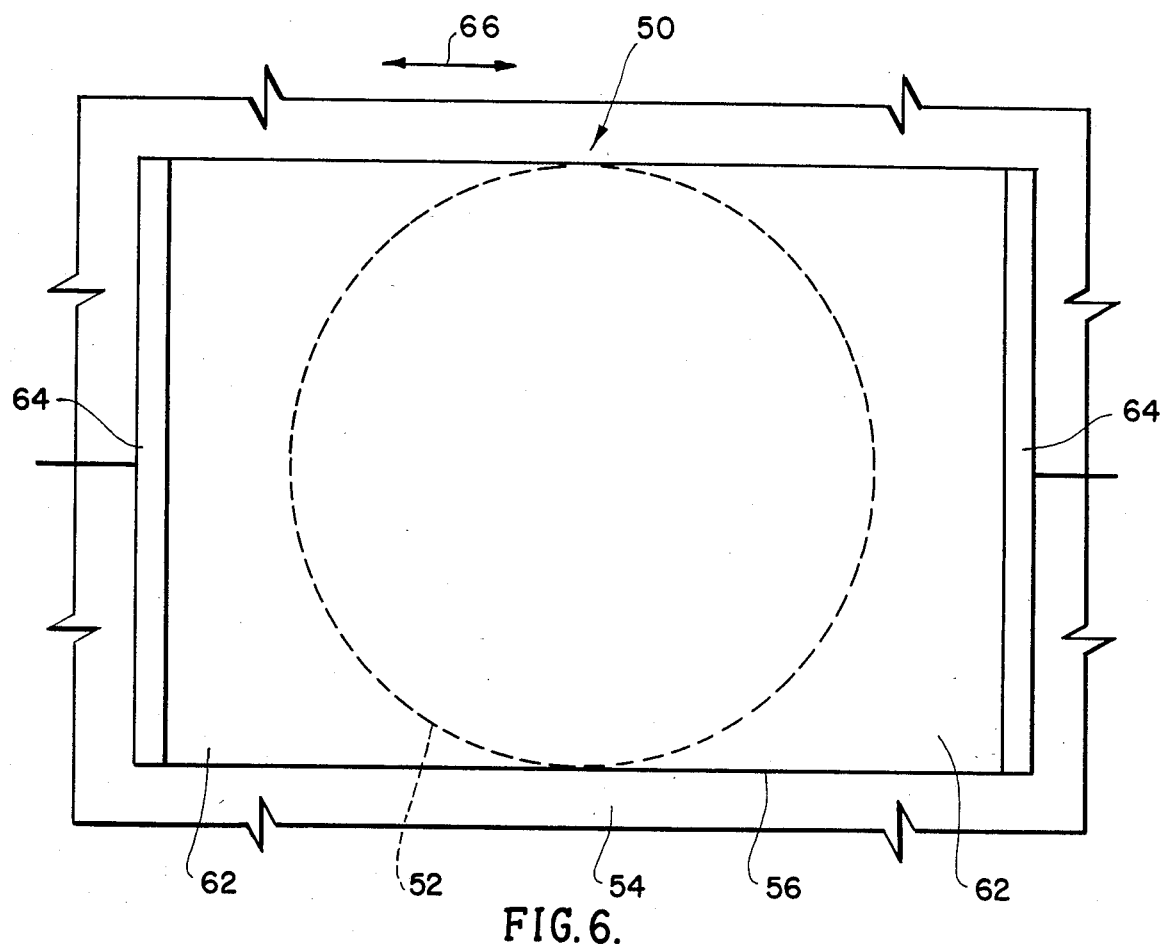
FIG. 6 is a plan view of FIG. 5.
Figure 5:
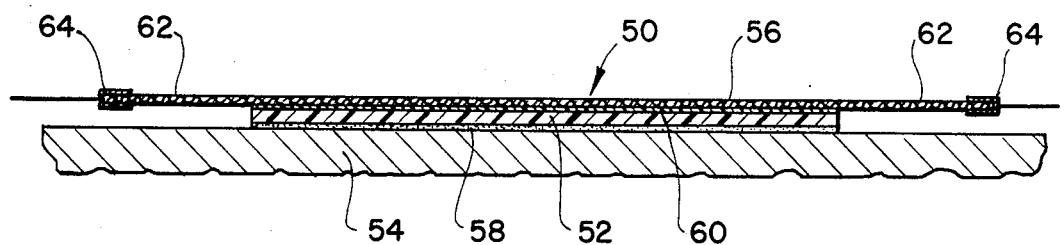
FIG. 5 illustrates another embodiment of the invention system.

In accordance with a further embodiment as illustrated in FIGS. 5 and 6, the system 50 comprises a fiber reinforced nonautoclaved "B" staged or a precured epoxy resin patch 52 positioned over a parent structure 54 and a single layer of unimpregnated graphite fiber tape or fabric 56 as heating element positioned over the patch 52. The patch 52 is separated from the parent structure 54 by a staged, e.g., epoxy, adhesive layer 58. An electrically insulating staged epoxy resin layer 60 is interposed between the patch 52 and heating element 56.

In this embodiment, the integral resistance heating element 56 has outwardly extending ears 62 at opposite ends of the heating ply, and bus bar attachments at 64, representative of a parallel circuit arrangement, with the electrical current being applied to the fibers extending in the zero direction, as indicated by the arrow 66 in FIG. 6. This parallel configuration or embodiment is cured similarly to the series configuration of FIGS. 1 and 2 but at 4–5 volts and 7.5–8.0 amps, following which the ears 62 can be removed.

Although the invention concept has been described for producing composites particularly as applied to repair of damaged structures, it will be understood that the invention concept can be applied broadly for bonding or laminating at least two components to produce a composite.

From the foregoing, it is seen that the invention provides a novel system and method for producing a composite and particularly for repair of advanced composites containing graphite, boron or Kevlar reinforcement, wherein localized heating is provided for the curing of such materials, in the form of an integral graphite or carbon heating element which forms a part of the cured composite. The invention system and method provide a number of important advantages and results, as noted above, and particularly avoid the use of a separate heating blanket normally employed in conventional vacuum bag curing of composite materials. Further, the size of the heated area is decreased according to the invention, the efficiency of operation is increased in that only low power requirements of the order of approximately 2–4 watts/square inch of patch area is required, the heat produced is applied only to the area to be cured, and the curing time is reduced. Further, repairs on structural components can be performed on sharp contours, repairs can be performed closer to metallic fittings and limited access repairs can be made. Reliability is further increased in reduced danger of repair induced damage to the structural material. Further, the integral heating element can be a load carrying member, thus increasing the strength of the resulting composite.

The system of the invention is feasible for high temperature applications, and is especially applicable for use in a hot bond repair kit. Finally, the curing system and procedure are simple and cost effective.

The repair system and method of the present invention employing a conductive carbon heating element which becomes an integral component of the composite is simpler and more economical than that of above U.S. Pat. No. 4,409,270, and the method of the present invention is particularly applicable for structural repairs, whereas the method of the patent is applicable primarily for cosmetic repairs.

Since further changes and modifications of the invention will occur to and can be made readily by those skilled in the art without departing from the invention concept, the invention is not to be taken as limited except by the scope of the appended claims.

What is claimed is:

1. A system for producing a composite which comprises
    a parent component,
    an electrical resistance heating element comprising a layer of graphite fibers impregnated with a partially cured thermosetting resin or a high temperature thermoplastic resin,
    means capable of bonding said heating element to said parent component to produce a composite upon heating said bonding means to a predetermined temperature, said bonding means comprising a film of a heat bondable material interposed between said parent component and said heating element, and
    electrical power means connected to said heating element.

2. The system of claim 1, said bonding means comprising a partially cured thermosetting resin.

3. The system of claim 1, said electrical resistance heating element comprising a layer of graphite fibers impregnated with a partially cured thermosetting resin.

4. The system of claim 1, said electrical resistance heating element comprising graphite tape or fabric.

5. The system of claim 1, said electrical resistance heating element comprising a layer of graphite fiber reinforced partially cured epoxy or epoxy-novolac resin.

6. The system of claim 1, said bonding means comprising a film of a heat curable adhesive.

7. The system of claim 1, said electrical resistance heating element comprising a layer of graphite fiber reinforced partially cured epoxy or epoxy-novolac resin, said bonding means comprising a film of a heat curable adhesive.

8. A system for producing a composite which comprises,
    a parent component,
    a first layer of graphite fibers impregnated with a heat bondable thermosetting resin,
    a film of heat curable adhesive positioned between said component and said first layer,
    a second layer of graphite fibers positioned on said first layer,
    and electrical connections to said second layer of graphite fibers, whereby said second layer functions as a resistance heating element so that when electrical current is passed therethrough, and the temperature raised to a predetermined value, said layers become integrally bonded through said adhesive film to said parent component.

9. The system of claim 8, wherein said parent component is a cured resin component, said first layer comprises a graphite fiber reinforced partially cured epoxy or epoxy-novolac resin, and said second layer is an electrical resistance element comprising graphite tape or fabric.

10. The system of claim 8, including means for applying pressure to the assembly for bonding said heating element to said component during resistance heating to said predetermined temperature value.

11. A system for repairing a damaged structural component which comprises,
    a parent structural component to be repaired,
    a patch to be bonded to said component, said patch positioned on the surface of said parent structure, said patch including an electrical resistance heating element in the form of a layer of graphite fibers,
    a film of a heat bondable adhesive between said patch and said parent component, said adhesive film capable of bonding said patch to said parent component upon heating said adhesive film to a predetermined temperature, and electrical connections to said electrical resistance heating element, whereby upon heating said film to a predetermined temperature, said patch becomes integrally bonded to said parent component to form a composite.

12. The system of claim 11, said layer of graphite fibers being impregnated with a heat curable thermosetting or a thermoplastic resin.

13. The system of claim 11, said patch further including a layer of graphite fibers impregnated with a heat curable thermosetting resin or a thermoplastic resin, said last-mentioned layer being in contact with said electrical resistance heating element and in contact with said adhesive film.

14. The system of claim 12, said heat curable thermosetting resin being a partially cured epoxy resin, and said thermoplastic resin being a high temperature thermoplastic resin.

15. The system of claim 13, said heat curable thermosetting resin being partially cured epoxy resin, and said thermoplastic resin being a high temperature thermoplastic resin.

16. The system of claim 11, said heating element being configured to provide a series electrical circuit or a parallel electrical circuit.

17. A system for producing a composite which comprises
- a parent component,
- a first layer of graphite fibers impregnated with a heat bondable thermosetting resin,
- a film of heat curable adhesive positioned between said component and said first layer,
- a second layer of graphite fibers positioned on said first layer,
- electrical connections to said second layer of graphite fibers, whereby said second layer functions as a resistance heating element so that when electrical current is passed therethrough, and the temperature raised to a predetermined value, said layers become integrally bonded through said adhesive film to said parent components, and
- a bagging material positioned over said resistance heating element, for applying pressure to the assembly for bonding said heating element to said component during resistance heating to said predetermined temperature value.

18. A system for repairing a damaged structural component which comprises,
- a parent structural component to be repaired,
- a patch to be bonded to said component, said patch positioned on the surface of said parent structure, said patch including an electrical resistance heating element in the form of a layer of graphite fibers,
- a film of a heat bondable adhesive between said patch and said parent component, said adhesive film capable of bonding said patch to said parent component upon heating said adhesive film to a predetermined temperature,
- electrical connections to said electrical resistance heating element, whereby upon heating said film to a predetermined temperature, said patch becomes integrally bonded to said parent component to form a composite,
- plate means positioned over the assembly, and
- vacuum bagging over said plate means for applying pressure to said assembly for bonding said patch to said parent component during resistance heating to said predetermined temperature.

19. A process for producing a composite, which comprises,
- placing a parent component of said composite in contiguous relation with an electrical resistance heating element comprising a layer of graphite fibers impregnated with a heat curable thermosetting resin or a high temperature thermoplastic resin,
- placing a film of heat bondable material between said resistance heating element and said component, and
- passing an electric current through said resistance element and heating said bondable film to a predetermined temperature, thereby causing said heating element to become bonded to said component.

20. A process for producing a composite, which comprises,
- placing a parent component of said composite in contiguous relation with an electrical resistance heating element comprising a layer of graphite fibers,
- placing a film of heat bondable material between said resistance heating element and said component,
- placing an additional layer of graphite fibers impregnated with a heat bondable thermosetting resin or a high temperature thermoplastic resin, between said electrical resistance heating element and said heat bondable film, and
- passing an electric current through said resistance element and heating said bondable film to a predetermined temperature, whereby said resistance heating element and said additional layer become bonded to said component upon passage of electrical current through said heating element.

21. The process of claim 20, said layer comprising graphite fiber reinforced partially cured epoxy or epoxy-novolac resin or polyether ether ketone resin.

22. The process of claim 20, said parent component being a cured resin component, said electrical resistance element comprising graphite tape or fabric, and said additional layer comprising graphite fiber reinforced partially cured epoxy resin.

23. A process for repairing a damaged structural component which comprises,
- placing a patch on the surface of said structural component, said patch including an electric resistance heating element in the form of a layer of graphite fibers,
- incorporating an adhesive film of a heat curable thermosetting resin between said patch and said structural component,
- passing an electric current through said resistance heating element and heating said heat curable thermosetting resin to a predetermined temperature, thereby causing said patch and said heating element to be integrally bonded to said structural component to form a composite.

24. The process of claim 23, said layer of graphite fibers being impregnated with a heat curable thermosetting resin or a high temperature thermoplastic resin.

25. The process of claim 23, said patch further including a layer of graphite fibers impregnated with a heat curable thermosetting resin or a high temperature thermoplastic resin, said last-mentioned layer being in contact with said electrical resistance heating element and in contact with said adhesive film.

26. The process of claim 23, said heat curable thermosetting resin being a partially cured epoxy resin.

27. The process of claim 25, said heat curable thermosetting resin being a partially cured epoxy resin.

28. A process for producing a composite, which comprises,
- placing a parent component of said composite in contiguous relation with an electrical resistance heating element comprising a layer of graphite fibers,
- placing a film of heat bondable material between said resistance heating element and said component,
- vacuum bagging the assembly,
- passing an electric current through said resistance element and heating said bondable film to a predetermined temperature, thereby causing said heating element to become bonded to said component, and
- applying pressure to the assembly during passage of electric current through said heating element and during said bonding.

29. A process for repairing a damaged structural component which comprises,
- placing a patch on the surface of said structural component, said patch including an electric resistance heating element in the form of a layer of graphite fibers,
- incorporating an adhesive film of a heat curable thermosetting resin between said patch and said structural component,
- vacuum bagging the assembly of said structural component and said patch,
- passing an electric current through said resistance heating element and heating said heat curable thermosetting resin to a predetermined temperature, thereby causing said patch and said heating element to be integrally bonded to said structural component to form a composite, and
- applying pressure to said assembly during passage of an electric current through said resistance heating element.

30. The composite produced by the process of claim 19.

31. The composite produced by the process of claim 20.

32. The composite produced by the process of claim 28.

33. The composite produced by the process of claim 29.

34. The composite produced by the process of claim 23.

35. The composite produced by the process of claim 24.

36. The composite produced by the process of claim 25.

37. The composite produced by the process of claim 27.

* * * * *